United States Patent [19]

Decker et al.

[11] 4,349,952

[45] Sep. 21, 1982

[54] APPARATUS AND METHOD FOR FIELD CONVERSION OF CORRODED PIVOTAL COUPLINGS TO NON-CORRODABLE COUPLINGS

[75] Inventors: Elmer L. Decker, Long Beach; James Moon, Santa Ana, both of Calif.

[73] Assignee: Quadco Alaska, Inc., Farmington, N. Mex.

[21] Appl. No.: 144,063

[22] Filed: Apr. 28, 1980

[51] Int. Cl.³ .............................................. B23P 19/04
[52] U.S. Cl. .................................... 29/402.06; 29/252; 29/282; 29/426.1; 409/279; 409/283
[58] Field of Search ........... 29/402.01, 402.03, 402.04, 29/402.06, 402.09, 402.11, 426.1, 282, 427, 252, 251; 409/279, 247, 283; 59/7, 11

[56] References Cited

U.S. PATENT DOCUMENTS

| | | | |
|---|---|---|---|
| 1,932,760 | 10/1933 | West | 409/283 |
| 1,986,493 | 1/1935 | Abramson | 59/7 |
| 2,089,753 | 8/1937 | Lapointe | 409/283 |
| 2,387,551 | 10/1945 | Abramson | 59/7 |
| 2,814,238 | 11/1957 | Schupner | 409/283 |
| 3,058,295 | 10/1962 | Temple | 59/7 |
| 3,553,960 | 9/1968 | Ellefson | 59/11 |
| 4,063,412 | 12/1977 | Bruzek | 59/7 |
| 4,161,810 | 7/1979 | Beard | 29/157.3 C |

FOREIGN PATENT DOCUMENTS 606709 5/1978 U.S.S.R. ................................ 29/252

Primary Examiner—Gene Crosby
Attorney, Agent, or Firm—Paul A. Weilein

[57] ABSTRACT

An apparatus and method for the in situ field conversion of the components of pivotal couplings, particularly as utilized for connecting hydraulic load sensing devices into deadline cable anchoring apparatus, and which have become stuck and inoperative due to corrosion, into a coupling having a substantially non-corrosive pivot pin and associated bearing surfaces. The apparatus embodies a unique arrangement of components in which a yoke structure is selectively attached to one of the couplings of the hydraulic load sensing device of the cable anchoring apparatus, a hydraulic cylinder-piston is connected with the yoke in one operating mode to provide a pushing force for a connected pusher tool for forcibly removing the stuck pivot pin of the coupling, and wherein the cylinder-piston is thereafter reconnected with the yoke in another operative mode to provide a pulling force for a connected broaching tool for broaching the bearing bore surfaces for the pivot pin so as to increase their diameters to a size adapted to receive new bearing liners of a substantially non-corrosive material, and having an inner diameter of a size to receive a new pivot pin of a substantially non-corrosive material.

28 Claims, 5 Drawing Figures

APPARATUS AND METHOD FOR FIELD CONVERSION OF CORRODED PIVOTAL COUPLINGS TO NON-CORRODABLE COUPLINGS

BACKGROUND OF THE INVENTION

The present invention relates generally to fastening devices.

In the well drilling industry, it has been an established practice for many years to utilize deadline cable anchoring apparatus of the general type disclosed in U.S. Pat. No. 3,056,287, and which included a hydraulic sensing device for indicating the load tension forces on the anchored cable.

In the typical cable anchoring and load sensing apparatus, the cable is connected to a snubbing drum that is operable under the applied cable tension forces to relatively separate upper and lower sets of coupling ears which are respectively coupled by means of pivot pins to connection lugs of a hydraulic load sensing device having a load responsive diaphragm.

Large numbers of these existing cable anchoring and load sensing apparatuses have been fabricated with steel pivot pins for coupling the sensing device lugs to the set of ears of the cable anchoring apparatus. It has now been discovered that, when these couplings with the steel pivot pins are exposed to the rigors of the elements under field operating conditions, the pins become corroded and cause the couplings that connect the sensing device to the ears of the cable anchoring apparatus to seize and become fixed. As a result, flexing forces are transmitted to the diaphragm of the sensing device and ultimately cause its deformation and failure.

The replacement of the damaged diaphragms by the field servicemen has thus presented a long-standing and continuing anchor problem. Servicemen usually resort to the drastic procedure of utilizing a sledge hammer to drive out the stuck pivot pins, which at times may take several hours of labor. Where this procedure failed, the serviceman would melt out the stuck pivot pin with an acetylene torch, a procedure which usually damaged the coupling ears of the cable anchoring apparatus and required expensive replacements.

The present invention not only solves the problem of removing the stuck corroded pivot pins in the field in a facile and economical manner, but also provides an apparatus and method whereby the coupling pivot pins and associated bearing surfaces may be up-dated by the installation of new pivot pins and associated bearing surfaces of a substantially non-corrosive material, such as stainless steel.

For such purpose, there is provided a unique hydraulically actuated apparatus in which a yoke frame structure is so designed that it can be operatively attached to the ears of the coupling containing the stuck pivot pin. The cylinder of a hydraulic cylinder-piston actuator assembly is connectable at one end with the frame structure in a manner such that the piston will be in axial alignment with the stuck pin, and a connected pusher element, engaged with the adjacent end of the stuck pivot pin, will be operative upon energization of the hydraulic actuator to apply a pushing force against the stuck pivot pin and axially force it out of the bearing bore surfaces formed in the coupling ears. Provision is made for reconnecting the other end of the cylinder of the hydraulic actuator to the frame structure so that the piston will move in a pulling direction, whereby upon attachment of a broaching tool to the piston, the bearing bores of the coupling may be broached to a predetermined enlarged diameter of a size to receive new bearing liners of a substantially non-corrosive material such as stainless steel, and an appropriate inner diameter to provide bore bearing surfaces for a replacement new pivot pin of a substantially non-corrosive material such as stainless steel.

SUMMARY OF THE INVENTION

More specifically, the present invention is concerned with a unique apparatus and method which enables rehabilitation in the field of the couplings utilized for attaching the hydraulic sensing devices of cable anchoring and load sensing apparatus, where such couplings have become stuck and inoperative due to corrosion, and wherein the coupling pivot pins and associated bearing surfaces may be replaced by substantially non-corrosive components.

One object of the invention is to provide a novel apparatus and method for converting the components of pivotal couplings in which the pivot pin has become stuck and inoperative due to corrosion, into a coupling having a substantially non-corrosive pivot pin and associated bearing surfaces.

A further object resides in the provision of a versatile apparatus in which a hydraulic force generating means is connectable in one mode to actuate a pusher tool to remove a corroded stuck pivot pin of a coupling, and thereafter is connectable in another mode to actuate a connected broaching tool for broaching the pivot pin bearings to an increased diameter size for the reception of bearing liners of a substantially non-corrosive material and a size to receive a new pivot pin of substantially non-corrosive material.

Another object is to provide an improved apparatus for converting in the field the coupling connections by which a hydraulic load sensing device is connected between the relatively movable load responsive arms of a cable anchoring apparatus, in which a yoke member is successively attachable to each of the coupling connections, and a hydraulic actuator mounted on the yoke member and coupled with a pusher tool is initially operable to remove the stuck corroded pivot pins of the couplings, and in which the yoke is connectable between the coupling connections, and the hydraulic actuator is operable to pull a connected broaching tool through the bearing bore surfaces associated with the stuck pivot pin, so as to increase their diameter to a size adapted for the reception of new bearing liners of a substantially non-corrosive material, and which have an inner diameter of a size to receive a replacement pivot pin of a substantially non-corrosive material.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings which are for illustrative purposes only.

DESCRIPTION OF A PREFERRED EMBODIMENT

Figure 1:
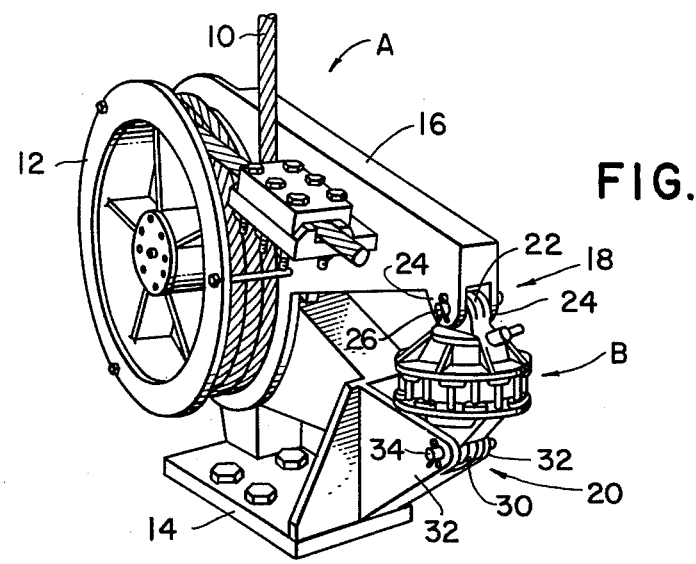
FIG. 1 is a perspective view of a combined cable anchor and load indicator in the form of a hydraulic sensing device which is operatively connected by pivotal couplings of the type to which the apparatus of the present invention may be connected and utilized to rehabilitate the pivotal couplings.

Referring more specifically to the drawings, for illustrative purposes, there is shown in FIG. 1 a combined cable anchoring apparatus, as generally indicated at A, which incorporates a hydraulic sensing device B of conventionally known construction in which tension forces on a cable, such as the deadline cable 10, will act upon a diaphragm and convert the applied force into an accurately proportioned hydraulic force. Briefly, in the disclosed apparatus, the cable 10 is connected to a snubbing drum 12 that is rotatably supported upon a base 14. A lever arm 16 is affixed to the drum and is adapted to swingably move in an arcuate path in response to rotation of the snubbing drum under applied cable forces.

The sensing device B is operatively connected between the base 14 and movable arm 16 by means of upper and lower coupling assemblies, as generally indicated at 18 and 20. More specifically, the coupling assembly 18 comprises a top connection lug 22 of the sensing device, this lug being positioned between a pair of axially aligned ears 24 on the lever arm 16, the lug and ears being interconnected by means of a pivot pin 26 which has bearing bore surfaces 28 formed in the ears 24. In a similar manner, the coupling assembly 20 includes a bottom connection lug 30 of the sensing device, base ears 32 and a pivot pin 34 having bearing bore surfaces in the base ears 32.

Cable anchoring and load sensing apparatus of the above described character have been manufactured, sold and operated in relatively large numbers over the years for use in the well drilling industry. At the time of manufacture, these apparatuses were constructed with sensing device connection couplings in which the pivot pins and ears were made of a steel material which had a tendency to corrode when exposed to the rigors of the elements under field operating conditions. Such corrosion resulted in impaired operating ability of the couplings such that the sensing device hydraulic acting diaphragm became inoperable and ultimately damaged.

Figure 2:
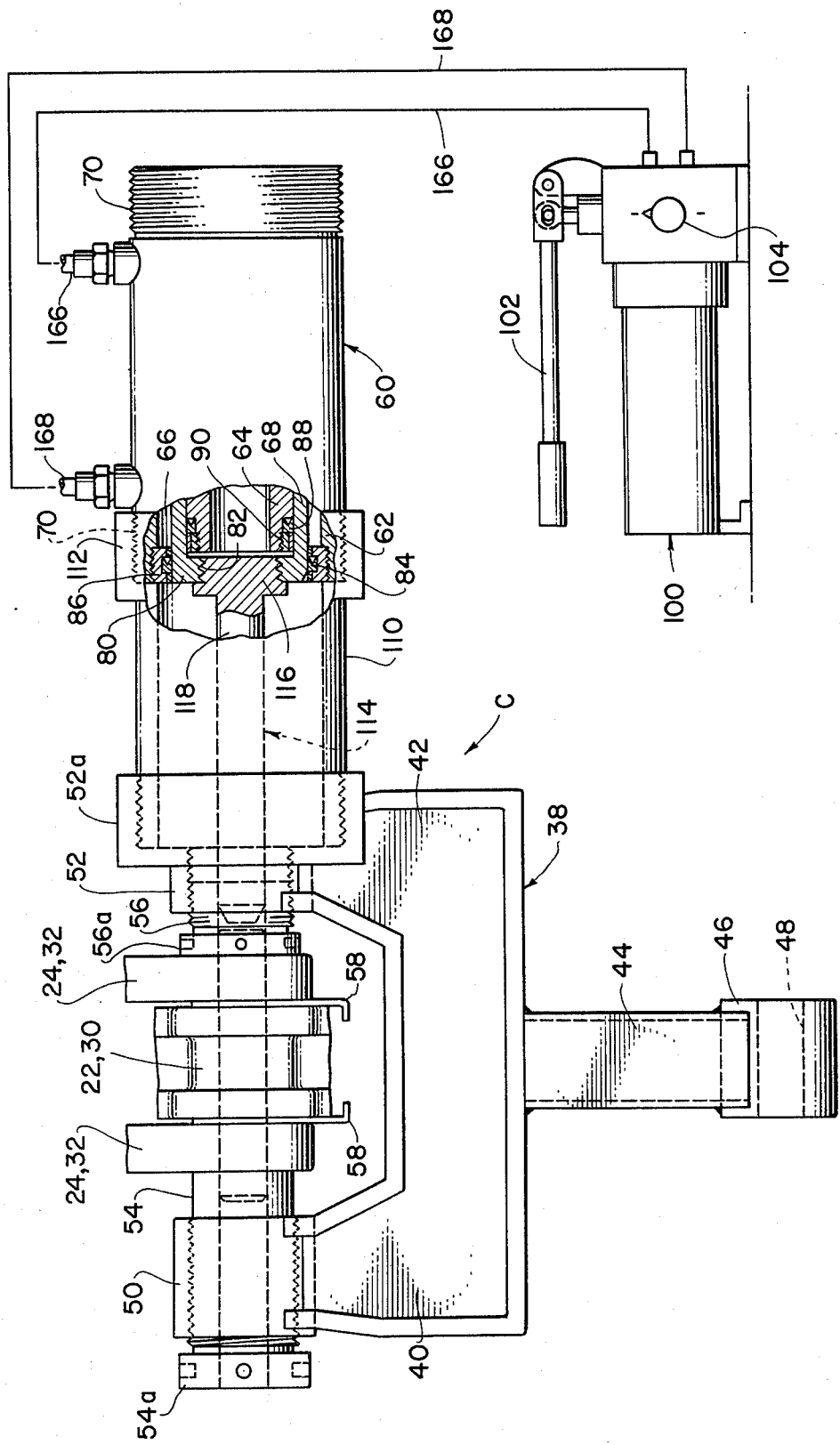
FIG. 2 is a plan view of the apparatus according to the present invention, and showing the manner of attachment to one of the connecting couplings for use in removing a stuck pivot pin, a portion of the hydraulic actuator being shown in section to indicate the details of the attachment of a pusher tool to the hydraulic piston.

The apparatus of the present invention finds particular use in connection with these field devices and provides a unique hydraulically powered apparatus which permits the corroded and stuck pivot pins of the connecting couplings to be removed more economically, and the bore bearing surfaces of the ears to be rehabilitated by installation of substantially non-corrosive bearing liners and a replaceable non-corrosive pivot pin. As best shown in FIG. 2, the apparatus of the present invention comprises a unique hydraulically powered apparatus, as generally indicated at C, which facilitates the rehabilitation of the field of the corroded and stuck couplings connecting the hydraulic sensing devices into the cable anchor apparatus.

More specifically, the apparatus of the present invention comprises a frame structure in the form of a Y-shaped yoke, as generally indicated by the numeral 38, and which is formed with a pair of spaced apart legs 40 and 42, these legs being interconnected by a bridging portion which medially mounts an oppositely extending central leg 44 having its outer end welded or otherwise secured to an annular bushing 46 containing an axially extending bore 48.

The legs 40 and 42 are terminated at their ends in axially aligned cylindrical portions 50 and 52, the portion 50 being internally threaded to receive an externally threaded tubular aligning bushing 54, and the cylindrical portion 52 being internally threaded to receive a threaded aligning bushing 56. The bushing 54 is provided at its outer end with a head portion 54a, while the bushing 56 is provided on its inner end with a head portion 56a, these head portions being respectively formed with peripheral radial recesses which are adapted to receive a pin or other suitable tool by means of which the bushing may be actuated.

The apparatus C is initially utilized to remove the stuck pivot pins from the coupling assemblies 18 and 20, and for this purpose the yoke 38 will be attached to one of the couplings in the manner illustrated in FIG. 2. As shown, the yoke is positioned so that it will bridge the coupling, and with the cylindrical portions 50 and 52 axially aligned with the respective ends of the coupling pivot pin, the aligning bushings 54 and 56 may be turned into clamping engagement with the associated coupling ears and with their inner ends extending over the associated ends of the coupling pivot pin. In order to prevent deflection of the coupling ears by the clamping action of the aligning bushings, it has been found desirable to insert U-shaped shim elements 58 respectively between the coupling lug and each of the coupling ears.

Figure 3:
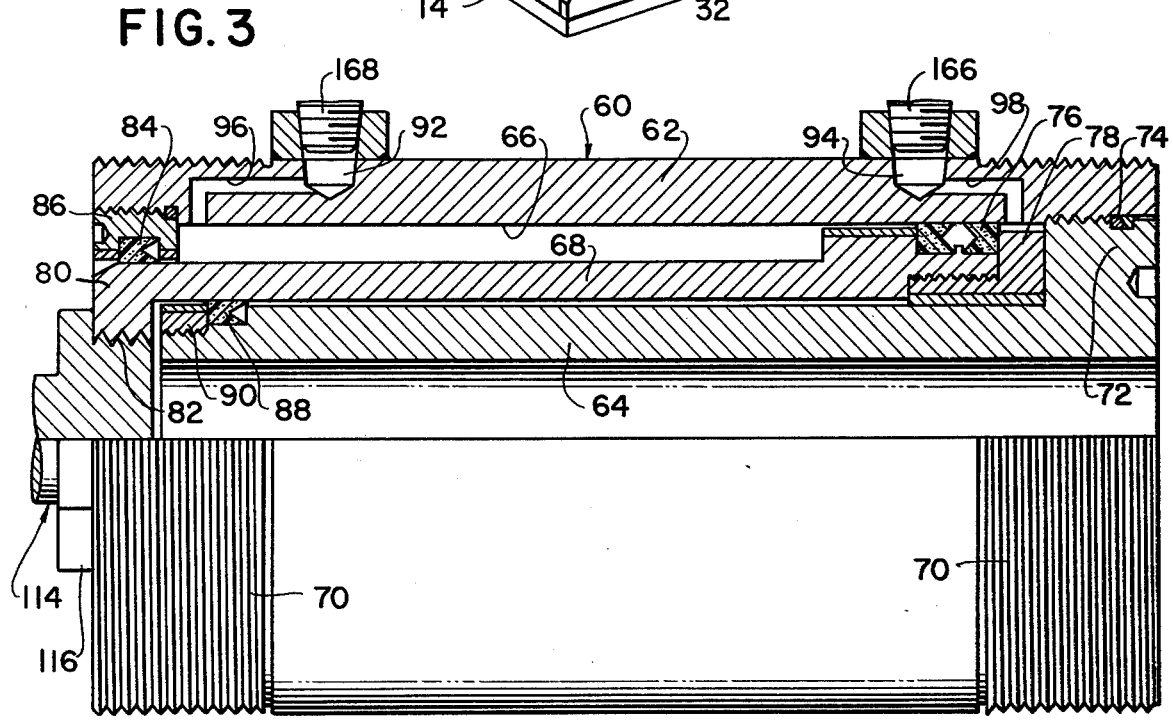
FIG. 3 is an enlarged fragmentary view, partly in section, of a hydraulic cylinder-piston actuator as utilized in the present invention, and showing the structural inter-relationship of its respective components.
Figure 5:
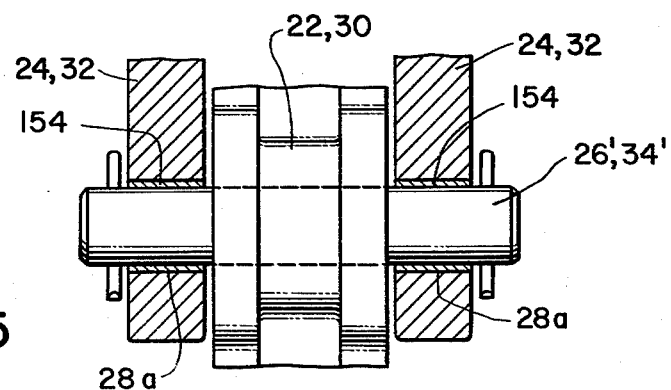
FIG. 5 is an enlarged view, partly in section, of a rehabilitated coupling structure, in which a substantially non-corrosive pivot pin is supported in bearing liners of a substantially non-corrosive material.

The relatively large operative force required for the apparatus is obtained by the utilization of a hydraulic cylinder-piston unit as generally indicated at 60. As best shown in FIG. 3, this unit comprises an outer cylinder shell 62 and an inwardly spaced inner cylinder shell 64 which cooperatively define an annular cylinder cavity 66 within which there is reciprocably mounted a tubular piston 68. The outer cylinder shell 62 is provided at each end with connection threads 70, and the annular cylinder cavity 66 is closed at its right end, FIG. 3, by an integrally formed radial outwardly projecting flange 72 having threaded engagememt with internal threads at the adjacent end of the outer cylinder shell. Preferably, this connection is sealed by a peripherally extending ring seal 74.

The inner end of the piston 68 is provided with an annular packing 76 which is retained by a lock nut 78, the packing having its outer circumferential surface in sliding engagement with the interior surface of the outer cylinder shell 62. The outer end of the tubular piston 68 is formed with an inwardly extending radial flange 80 formed to provide a threaded bore 82. The outer end of the tubular piston 68 is reciprocable between a surrounding outer packing 84 retained by a lock nut 86 having threaded engagement with the adjacent end of the outer cylinder shell 62, and an inner packing 88 retained by a lock nut 90 having threaded engagement with the adjacent end of the inner cylinder shell 64. The outer cylinder shell 62 adjacent its ends is provided with port connections 92 and 94 which are in communication with the annular cylinder cavity 66 on opposite sides of the packing 76 by means of passageways 96 and 98.

As shown in FIG. 2, provision is made for supplying pressurized hydraulic fluid to the cylinder-piston unit 60 from a manually operable hydraulic pump of conventional construction, as generally indicated by the numeral 100, this pump being manually operable by means of a pumping handle 102, and being constructed with a reversing valve which is selectively operable by means of a knob 104 to reversibly connect piping 166 and 168 as supply and return lines to the cylinder-piston unit 60, whereby the unit may function in a double acting manner to hydraulically extend and retract the piston 68.

When the apparatus is to be utilized for removing a stuck pivot pin from a coupling, the apparatus will be connected as shown in FIG. 2, and when so used the cylinder-piston unit 60 will be connected with the leg 42 of the yoke 38 by means of a tubular extension 110 which is threaded at one end for connection with the internal threads of an enlarged end 52a of the cylindrical portion 52. The opposite end of the tubular extension 110 is formed with an enlarged end 112 which is internally threaded to engage the associated threaded end of the outer cylinder shell 62 of the cylinder-piston unit. This extension is necessary for the reason that an elongate pusher tool 114 must be connected with the tubular piston 68 when the piston is in retracted position, and the pusher tool is to be aligned with the piston pin so that the outer end of the pusher tool will engage the adjacent end of the pin. To facilitate connection of the pusher tool with the tubular piston 68, the pusher tool is constructed to provide a head portion 116 at one end of a cylindrical shank 118 of the pusher tool. The head portion is externally threaded for threaded connection with the threads of the inwardly extending radial flange 80 at the outer end of the tubular piston 68. It will thus be seen that, when the cylinder-piston unit 60 is to be used for pin removal, it will be connected in the mode shown in FIG. 2, wherein movement of the piston to an extended position will operate to produce a pushing force against the stuck pivot pin to force the pin out of its corroded bearings in the coupling ears. Since the aligning bushing 54 is of tubular construction, the pin may be forced outwardly through this bushing during removal.

Figure 4:
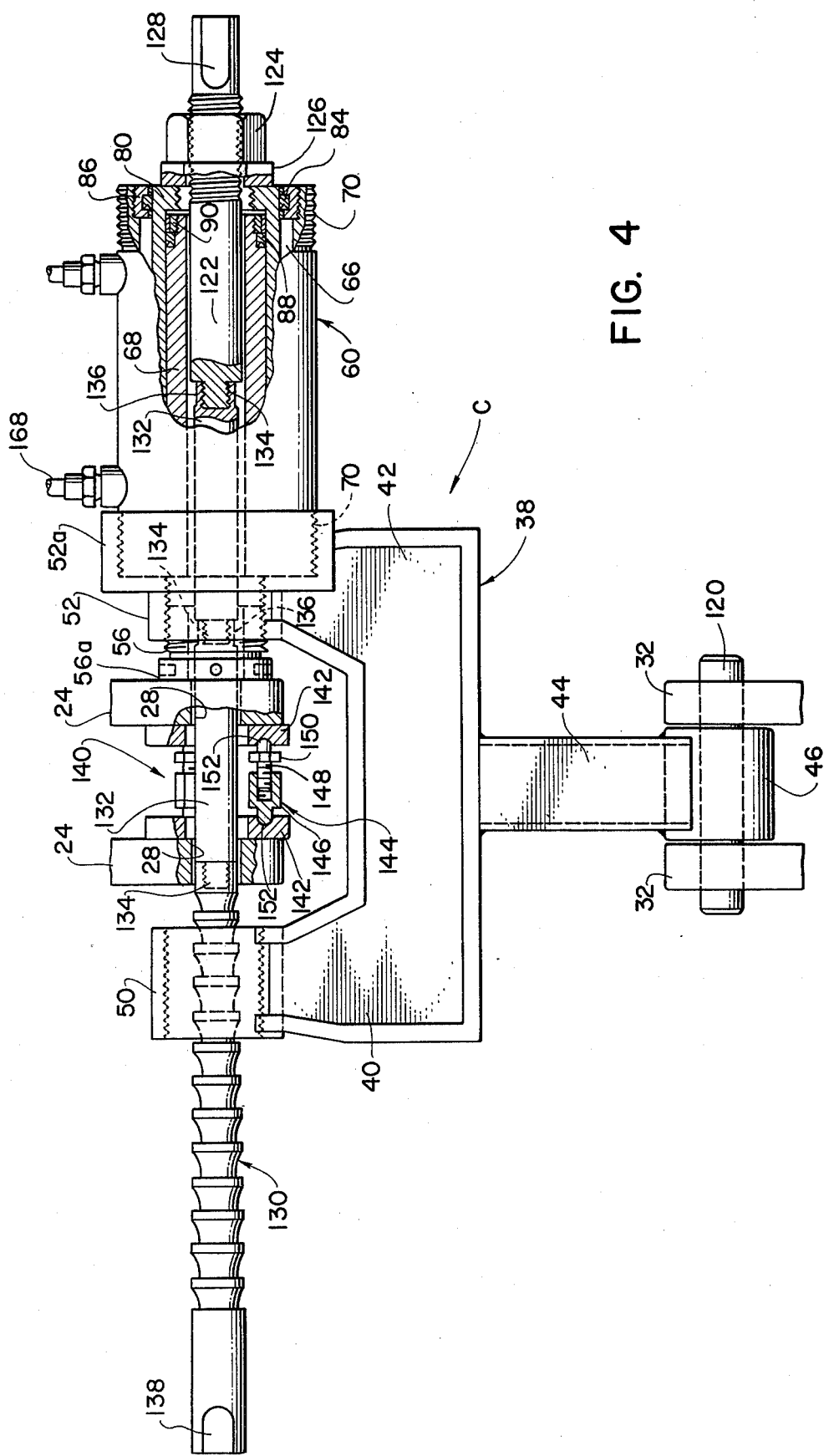
FIG. 4 is an elevational view illustrating the attachment of the apparatus of the present invention in a position connected between the connecting ears of the couplings for the load sensing device of the cable anchoring and sensing apparatus, and the manner of connecting a broaching tool to the hydraulic actuator for broaching the bearing surfaces of the coupling ears.

When the apparatus is to be utilized for broaching the pivot pin bearing surfaces in the coupling ears, for example, the ears 24 of the upper coupling assembly 18 as shown in FIG. 1, the apparatus will be connected in the manner shown in FIG. 4. More specifically, the yoke 38 will, in this instance, be connected between the ears 24 of the upper coupling connection and the ears 32 of the lower coupling connection, after the stuck pins have been removed and the hydraulic sensing device B removed. This will permit the yoke 38 to be placed in position with the bushing 46 on the central leg 44 connected with the ears 32 by means of a pivot pin 120. The cylindrical portion 50 from which the aligning bushing 54 has been removed, and the cylindrical portion 52 with the aligning bushing 56 therein are brought into axial alignment with the bores 28 of the ears 24, whereupon the aligning bushing 56 may be rotated to bring its head portion 56a into snug engagement with the adjacent surface of the ear 24.

For the broaching operation, the cylinder-piston unit 60 will be connected to the yoke 38 in a different mode from that utilized for removing the pivot pin. Thus, for the broaching operation the cylinder-piston unit 60 will be connected with its ends reversed to that shown in FIG. 2 in order to now provide a pulling force instead of a pushing force, when the piston is moved from a retracted to an extended position. In making this connection, the extension 110 will be removed, and the adjacent end of the outer cylinder shell connected directly to the enlarged end 52a.

For this operation, the pusher tool 114 will be disconnected, and in its place a primary pull bar section 122 will be inserted into the outer end of the tubular piston 68. The projecting outer end of the primary pull bar section 122 is threaded to receive an adjusting nut 124 which bears against a washer 126 arranged to abut the inwardly extending radial flange 80 at the end of the tubular piston 68. This end of the bar 122 is preferably provided with a flat 128 to facilitate the application of a tool in order to hold the bar 122 against rotation while adjusting the nut 124. Adjustment of the nut 124 is also utilized to position a connected broaching tool 130 so that it will be substantially at the beginning of a broaching stroke.

The length of the broaching tool required to broach the spaced bearing bores 28 of the ears 24, is of necessity of greater length than the movement of the piston 68 from a fully retracted to a fully extended position. It is therefore necessary to successively shorten the connection between the primary pull bar section 122 and the broaching tool 130, and reconnect the broaching tool after each successive extension of the piston. This is accomplished by providing several, in this case two, secondary pull bar sections 132 which are arranged to be threadedly coupled in end-to-end relation, with the primary pull bar section 122 and the broaching tool 130 by means of threaded joints, as indicated at 134, to facilitate the connection and disconnection of these elements. The secondary pull bar sections 132 are each provided with holding flat areas, as indicated at 136. Holding flat areas 138 are also provided on the shank portion of the broaching tool 130.

In order that the bore bearing surfaces in the coupling ears shall be maintained in axial alignment during the broaching process, it is desirable that means should be provided for maintaining the ears in parallelism and against relative deflection during the broaching process. This is accomplished in the present invention by providing a spreader, as generally indicated by the numeral 140, which can be positioned between the ears 24. The disclosed spreader is shown as comprising a pair of ring or split ring members 142 which may be positioned in engagement with the inner surfaces of the ears 24 and in coaxial alignment with the bores 28. A plurality of spreader jacks 144 are operable to snugly force the members 142 away from each other and into snug holding positions against the adjacent surfaces of the ears 24. The spreader jacks may vary as to construction, but in the present instance are shown as comprising in each case a nut member 146 and a threadedly engaged screw member 148 having a faceted portion 150 for the reception of a wrench or other actuating tool. The ends of each spreader jack are seated in aligned recesses 152 formed in the confronting surfaces of the members 142. Upon concluding the broaching operation, the apparatus may be disconnected from the ears by loosening the tubular aligning bushing 56 and then removing the spreader 140.

Tests have indicated that corrosion cannot be effectively prevented in couplings by utilizing a stainless steel pivot pin in ordinary steel bearing bores, or by utilizing stainless steel bearing bores and an ordinary steel pivot pin. Accordingly, in accordance with the present invention, bearing liners 154 of stainless steel are mounted in the enlarged broached bores. Appropriately, these liners may be retained in position by the utilization of an appropriate epoxy type adhesive 28a. The liners have an inner diameter of appropriate size to operatively receive a new replacement pivot pin 26' or 34' which is also of stainless steel. Thus, by using stainless steel bearing liners and a stainless steel pivot pin, it is possible to rehabilitate the stuck and corroded couplings in the field and provide up-dated couplings for the hydraulic sensing unit B, which will be substantially non-corrosive and provide efficient and trouble-free operation for many years.

From the foregoing description and drawings, it will be clearly evident that the delineated objects and features of the present invention will be accomplished.

Various modifications may suggest themselves to those skilled in the art without departing from the spirit of the disclosed invention and, hence, it is not wished to be restricted to the specific form shown or uses mentioned, except to the extent indicated in the appended claims.

What is claimed is:

1. Apparatus for use in converting a pivotal coupling, which has become stuck and inoperative due to corrosive action on the engaged surfaces of its pivot pin and associated bearing surfaces, into a substantially non-corrosive coupling which comprises:
   a frame structure for attachment to the stuck and inoperative coupling;
   hydraulic means carried by said frame structure including a cylinder and reciprocable piston;
   a pusher tool initially connectable to said piston and having an end engageable with an end of the stuck pivot pin, and upon energization of said hydraulic means being operative to apply pressure in a direction to axially remove the stuck pivot pin from its associated bearing surfaces; and
   a broaching tool thereafter connectable to said piston in axial alignment with said bearing surfaces, and upon energization of said hydraulic means being operative to broach the bearing surfaces so as to increase their diameters to a size that will enable the mounting therein of new bearing liners of a substantially non-corrosive material for the reception of a new pivot pin of a substantially non-corrosive material.

2. Apparatus according to claim 1, in which:
   said frame structure comprises a yoke member having spaced apart legs formed with axially aligned bores adapted to be positioned in axial alignment with the ends of said stuck pivot pin;
   means secures the yoke bores in said axial alignment position; and
   said cylinder is connectable at one end to one of the legs of said yoke in axial alignment with its bore.

3. Apparatus according to claim 2, in which:
   the securing means for the yoke comprises at least one tubular aligning bushing threadedly supported in one of said yoke bores for axial movement into a position extending over a projecting end of said stuck pivot pin.

4. Apparatus according to claim 3, in which:
   a second tubular aligning bushing is threadedly supported in the other of said yoke bores and is adjustable to extend over the other projecting end of said stuck pivot pin.

5. Apparatus according to claim 2, in which:
   the cylinder is connected to said one of the yoke legs by means of a tubular extension.

6. Apparatus according to claim 5, in which:
   said extension is removably threadedly connected at its opposite ends respectively with said cylinder and said one of the yoke legs.

7. Apparatus according to claim 2, in which:
   said pusher tool comprises an elongate cylindrical shank portion formed at one end with an integral head portion having external threads for threadedly engaging a threaded axial opening at one end of said piston, whereby with the piston in a retracted position, the pusher shank portion will project outwardly beyond the adjacent end of the cylinder.

8. Apparatus according to claim 1, in which:
   said coupling comprises a pair of axially aligned spaced apart ears and a lug positioned between said ears, and the stuck pivot pin extends through an opening in said lug and has end portions supported in bore bearing surfaces in the respective ears; and
   spacer shims are positioned between the opposite sides of the lug and the associated ears during removal of the stuck pivot pin.

9. Apparatus according to claim 1, in which:
   the hydraulic means is connected to said frame in one mode wherein movement of the piston to an extended position will produce a pushing force when utilizing said pusher tool, and connected in another mode wherein movement of the piston to an extended position will produce a pulling force when utilizing said broaching tool.

10. Apparatus according to claim 1, in which:
    the hydraulic means is double acting and the cylinder has port connections at its opposite ends;
    hydraulic pumping means is manually operable for producing a pressurized output; and
    means are selectively operable to connect the pressurized output with said port connections.

11. Apparatus according to claim 1, in which:
    said coupling comprises a pair of axially aligned spaced apart ears having aligned pivot pin bore bearing surfaces;
    said frame structure comprises a generally Y-shaped yoke having spaced apart legs formed with axially aligned bores adapted to be positioned outwardly of said ears and in axial alignment with the bearing surfaces of said ears, and an intermediate oppositely extending leg having an outer end adapted for pivotal connection with another pair of coupling ears; and
    means secures the yoke bores in said axial alignment position for passage of the broaching tool.

12. Apparatus according to claim 11, in which:
    the yoke securing means includes a tubular bushing threadedly supported in the bore of one of said spaced apart yoke legs for axial movement into abutting engagement with the adjacent ear.

13. Apparatus according to claim 12, in which:
the hydraulic means is connected to said one of the spaced apart legs of the yoke in a mode to apply a pulling force on the connected broaching tool, as the piston is moved to an extended position.

14. Apparatus according to claim 13, in which:
pulling bar means connects the broaching tool with said piston.

15. Apparatus according to claim 14, in which:
the pulling bar means comprises a primary pulling bar section and a plurality of secondary pulling bar sections releasably interconnected in end-to-end relation whereby said secondary pulling bar sections are successively removable to enable advancement of the broaching tool in incremental movements by successive extension movements of said piston.

16. Apparatus according to claim 15, in which:
the broaching tool, and pulling bar sections are interconnected by threaded joints, and are respectively provided with flat surface areas to facilitate their connection and disconnection.

17. Apparatus according to claim 15, in which:
said primary pulling bar has an outer end threadedly engaged with an adjusting nut; and
an abutment washer is interposed between said nut and an adjacent end of said piston.

18. Apparatus according to claim 1, in which:
said coupling comprises a pair of axially spaced apart ears; and
spreader means are positioned between the spaced apart coupling ears, during the broaching operation.

19. Apparatus according to claim 18, in which the spreader means comprises:
a pair of substantially ring-shaped members respectively engaged with confronting inner surfaces of said ears; and
a plurality of spaced apart screw jacks extending between the ring-shaped members and coacting therewith to maintain the coupling ears in parallel relation during the broaching operation.

20. Apparatus for the field conversion of corroded and stuck pivotal couplings into substantially non-corrosive couplings, wherein the couplings are formed by upper and lower connection lugs of a hydraulic load sensing device, said lugs being connected by pivot pins to spaced pairs of ears carried by the load reactive elements of a cable anchoring apparatus, which comprises:
means including a frame structure adapted for connection to one of said pairs of ears;
hydraulic means including a cylinder and a piston, the cylinder being connected to said frame at its connection with one of said pairs of ears, and with its piston in axial alignment with pivot pin bore bearing surfaces formed in the associated said one pair of ears; and
a broaching tool connected to said piston, and being operable to broach the bore bearing surfaces of the associated said one pair of ears, when the hydraulic means is energized to move the piston in a direction to apply a pulling force to said broaching tool.

21. Apparatus according to claim 20, in which:
said frame structure comprises a generally Y-shaped yoke having spaced apart legs formed with axially aligned bores adapted to be positioned outwardly of said one of said pairs of ears and in axial alignment with their bearing surfaces, and an intermediate oppositely extending leg having an outer end adapted for pivotal connection to the other of said pairs of ears.

22. Apparatus according to claim 21, in which:
a tubular bushing is threadedly supported in the bore of one of said spaced apart yoke legs for axial movement into abutting engagement with the adjacent ear.

23. Apparatus according to claim 22, in which:
a pulling bar connects the broaching tool to said piston.

24. Apparatus according to claim 23, in which:
the pulling bar comprises a plurality of connected end-to-end sections which are successively removable to enable advancement of the broaching tool in incremental movements by successive extension movements of the piston.

25. Apparatus according to claim 24, in which:
spreader means are interposed between the ears of said one of said pairs of ears, during the broaching operation.

26. The method of converting the components of a pivotal coupling, which have become stuck and inoperative due to corrosive action on engaged end surfaces of its pivot pin and associated surrounding bearing surfaces, into a coupling having a substantially non-corrosive pivot pin and associated bearing surfaces which comprises the steps of:
applying a force axially against an end of the stuck pivot pin to remove the pin from the associated bearing surfaces;
broaching the bearing surfaces to similarly increase their diameters;
mounting annular bearing liners of a substantially non-corrosive material in the increased diameters of the bearing surfaces; and
installing a new pivot pin of a substantially non-corrosive material in operative association with said bearing liners.

27. The method according to claim 26, in which:
the force is a mechanically applied fluid pressure.

28. The method according to claim 26, in which:
the diameters of the bores of the bearing surfaces are increased by successive incremental broaching movements of a broaching tool.

* * * * *